United States Patent [19]

Kordesch et al.

[11] Patent Number: 4,957,827

[45] Date of Patent: Sep. 18, 1990

[54] RECHARGEABLE ALKALINE MANGANESE CELLS WITH ZINC ANODES

[75] Inventors: Karl Kordesch; Josef Gsellmann, both of Graz, Austria; Klaus Tomantschger, Mississauga, Canada

[73] Assignee: Battery Technologies Inc., Mississuaga, Canada

[21] Appl. No.: 234,926

[22] Filed: Aug. 22, 1988

[30] Foreign Application Priority Data

Jul. 8, 1988 [CA] Canada ................................. 571629

[51] Int. Cl.$^5$ ........................................... H01M 10/24
[52] U.S. Cl. ....................................... 429/60; 429/66; 429/224; 429/229; 429/190
[58] Field of Search ................. 429/224, 66, 229, 231, 429/206, 190, 57, 60

[56] References Cited

U.S. PATENT DOCUMENTS

| | | | |
|---|---|---|---|
| 3,888,699 | 6/1975 | Urry | 429/224 X |
| 3,905,834 | 9/1975 | Harada et al. | 429/190 |
| 3,945,847 | 3/1976 | Kordesch et al. | 429/224 X |
| 4,011,103 | 3/1977 | Kordesch | 429/66 |
| 4,091,178 | 5/1978 | Kordesch | 429/224 X |
| 4,113,921 | 9/1978 | Goldstein et al. | 429/224 X |
| 4,384,029 | 5/1983 | Kordesch et al. | 429/224 X |

*Primary Examiner*—Anthony Skapars
*Attorney, Agent, or Firm*—Donald E. Hewson

[57] ABSTRACT

A rechargeable alkaline electrochemical cell has a manganese dioxide cathode and a zinc anode. The cathode is mixed with graphite or other conductive carbon and a binder, and is contained by a metallic screen which also serves as an oxygen evolution catalyst. The screen also serves to contain the cathode in place as it tends to expand under use. A diaphram is provided to separate the cathode and anode; an alkaline electrolyte contains the cathode and anode, and the other components of the cell.

11 Claims, 1 Drawing Sheet

RECHARGEABLE ALKALINE MANGANESE CELLS WITH ZINC ANODES

FIELD OF THE INVENTION

This invention relates to rechargeable, alkaline, zinc-/manganese dioxide electrochemical cells in which the anode is powder zinc.

BACKGROUND OF THE INVENTION

Various attempts have been made to design such a rechargeable cell suitable for commercial production but difficulties have been encountered.

It is known that manganese dioxide ($MnO_2$) electrodes in alkaline electrolytes can be recharged if they are only discharged to the point to which the manganese dioxide is converted to the oxide of trivalent manganese ($Mn_2O_3$). If the discharge is continued beyond that level, crystal phases are formed which are different from the electrochemically active, rechargeable gamma manganese oxide which is of rutile structure. Thus, if discharge is continued beyond $Mn_2O_3$, a complex oxide of manganese is formed corresponding to the formula $Mn_3O_4$. This oxide is not rechargeable. In practice this means that the manganese dioxide electrode should not be discharged below the equivalent of the $MnO_{1.6}$ level, or, if the voltage is controlled, not below 0.9 V. In other words, the manganese dioxide cathode may only be used to about 40% of its capability if the rechargeable characteristic is to be retained. Unfortunately, it has been difficult to impose this limit with regard to the ordinary domestic user who has no way of knowing when it is reached.

Alkaline cells having manganese dioxide cathodes usually have powdered zinc anodes. It is common practice to bind the zinc powder together into a composite structure and to add zinc oxide to the electrolyte. References to these facts may be found in, for example, the book "Batteries, Vol 1", edited by K. Kordesch, published by Marcel Dekker, 1974. There have also been rechargeable, alkaline $Zn/MnO_2$ on the market but these cells were not a success due to the previously noted impossibility of the domestic user knowing when recharging was due.

In an attempt to overcome the above difficulty, cells were developed in which the amount of zinc in the anode was limited so that it was only possible to discharge the manganese dioxide cathode to about 40% of its theoretical capacity so that the customer could not destroy the rechargeable characteristics. Cells of this type were given a limited market release by a Japanese and a Finnish manufacturer. However, the manner of achieving the limitation of discharge—which could also be achieved by measuring the discharge voltage of a cell and activating a relay—did not fully satisfy commercial requirements in respect to overdischarge, overcharge and assurance against short circuit by dendrites during charge.

A further difficulty exists in the physical form of the cathode. This is usually manganese dioxide mixed with graphite. This mix swells and expands during discharge. This causes the resistance of the electrode to increase and in the worst case in a mechanical break up of the cathode. In this reference is made also to "Batteries, Vol. 1", pp. 201-219, by K. Kordesch and to several earlier attempts to achieve better cohesion of the electrodes by the addition of binders such as cement like in U.S. Pat. No. 2,962,540, or by adding graphitized textile fibres as described in U.S. Pat. No. 2,977,401 or by the addition of latex as in U.S. Pat. No. 3,113,050. A far more reaching measure for preventing the decomposition of the electrode during electrical cycling and prevent its tendency to swell takes the form of using a supplemental binder in accordance with U.S. Pat. No. 3,945,847, which uses a supplemental binder which is mixed with colloidal graphite. It essentially ensures the solidity and conductivity of the electrode. It can consist of polymers or copolymers of such materials as e.g., styrenes, butadienes, acrylonitriles, formaldehydes, vinyl alcohols or epoxies which are to be wetted by the electrolyte. A good example is also polysulfone dissolved in chlorinated hydrocarbons and mixed with colloidal graphites. While these binders as described improve the coherence of the cathode the ultimate expansion of the cathode could not always be prevented because the binding strength of the materials were exceeded. These expansions and contractions of the $MnO_2$ cathode during discharge and charge were measured and investigated in detail in scientific publications by Kordesch, Gsellmann and Tomantschger. As an example we cite the Publication in Electrochemica Acta, Vol. 26, No. 10, pp, 1495-1504, 1981. Accordingly, it is an objective of the invention in respect to the $MnO_2$ electrode to create conditions in which the discharge and charge characteristics take advantages of all possibilities to restrain the cathodes. U.S. Pat. No. 4,384,029 by K. Kordesch and J. Gsellmann describes the enclosure of the $MnO_2$ electrode by various means like mechanical cases, tubes, springs or mechanical wedges. While these means prove to be successful in cycling the $MnO_2$ cathodes with the provision of the zinc limitation in the range of 100 to 200 cycles the restriction of the mechanical cage proved to be a disadvantage in respect to the attainment of high current densities. The electrode interface is restricted by this mechanical means, therefore the current density achievable is limited. It was also found subsequently that rather heavy mechanical structures like tubes have to be used to restrain the expanding MnO2. The use of thicker walled tubes had the definite disadvantage of creating poorly conductive or even empty or gas filled spaces in the holes of the tubes which were noticeable by an increased impendance of the cell after extended cycling. The use of cement e.g., necessitates a relatively high percentage of the cement in the mixture (up to 10%) and therefore a reduction of the amount of the active ingredient. If not enough cement is mixed into the mixture then the structure has a tendency to crumble and crack and the purpose of achieving a coherent electrode is not reached.

It has now been found that if a binder is used for a manganese dioxide/graphite cathode mix and the cathode is retained in a restrictive thin screen structure the various difficulties with respect to physical cathode structure are inhibited. If the restrictive structure is also conductive it acts as an overvoltage reducing catalyst on the surface of the cathode in such a way that, on overcharge, oxygen is produced and can be released to travel to the zinc anode. Thus, an endless process is created keeping the cell from exceeding a certain pressure.

DISCLOSURE OF THE INVENTION

As a result of these discoveries it is now possible to produce an improved rechargeable, alkaline zinc/manganese dioxide electrochemical cell and accordingly the invention provides such a cell.

A cell according to the invention comprises a rechargeable, alkaline, electrochemical cell comprising:

a rechargeable manganese dioxide cathode mixed with graphite or other conductive carbon, agglomerated with a binder and contained by a metallic screen serving as an oxygen evolution catalyst carrier and providing restrictive force against cathode expansion; a powdered zinc anode contained in a metallic basket; a diaphragm or separator separating the cathode and the anode; and an alkaline electrolyte contacting the cathode and the anode through the screen, the basket and the diaphragm. The cathode may be molded, for example, as annulae or as longitudinal sections of a cylinder.

The screen comprises a foraminous stainless steel case in which the number and size of the holes may be chosen so that optimum strength is balanced by optimum ion transport through the holes. Additionally the screen may include an oxygen overvoltage reducing catalyst which may lower the overvoltage of oxygen to a degree that oxygen is evolved on overcharge, preferably before six-valent manganese is produced.

The diaphragm or separator may be permeable to the passage of oxygen to permit transport of oxygen produced on overcharge to the anode. Suitably it may comprises cellulose which may or may not be provided with fibrous reinforcement.

The electrolyte may comprise an alkali metal hydroxide such as potassium hydroxide or sodium hydroxide and it is preferably immobilised by gelling. It may be gelled with a gelling agent such as CMC, NaCMC, KCMC or other derivatives of CMC or a swelling agent of the group of methacrylics. The electrolyte may contain zinc oxide as an overcharge reserve. Amounts of zinc oxide may also be provided in admixture with the anode for the same purpose. Thus, should there be an overcharge situation, zinc oxide at the anode will constantly be converted to zinc.

Going into more details in describing the powder zinc anode according to the invention, a balance between Zn anode and the cathode has to be carefully observed. The oxygen evolving electrode must be the one which is first fully charged and when this 100% state of charge is reached metallic Zn must still be available in order to recombine with the gaseous oxygen. Since the charge current is flowing to the same extent through the anode and cathode it is advantageous to provide a surplus of ZnO on the anodic side which will, on overcharge, constantly be converted to Zn while correspondingly oxygen will be evolved on the positive electrode. An amount of approximately 10% ZnO referring to the metallic amount of Zn is sufficient.

BRIEF DESCRIPTION OF THE DRAWINGS

Embodiments of the invention will now be described by way of example with reference to the drawings, in which.

DETAILED DESCRIPTION OF THE PREFERRED EMBODIMENTS

Figure 1:
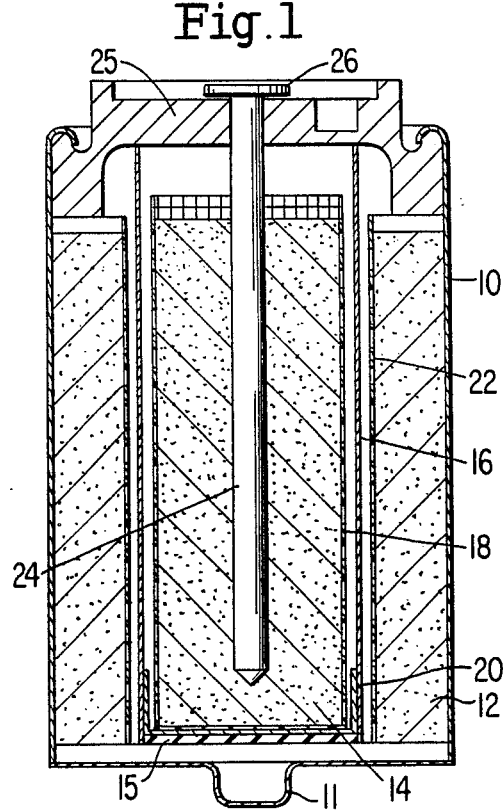
FIG. 1 is a diagrammatic sketch of a vertical section through a cell according to the invention.

FIG. 1 of the drawings shows an embodiment of a cell according to the invention. The cell comprises a steel can 10 housing a conventional metal oxide cathode 12. The base of can 10 has boss 11 forming the cathode contact formed cylindrically around anode 14. The cathode 12 comprises finely divided manganese dioxide and graphite or other conductive carbon agglomerated with a suitable binder and contained by a screen 22 which is a metallic structure.

The binder may be any suitable binder such as a cement, for example, Portland cement; PTFE; a dissolved plastics material, for example, polysulfone dissolved in a chlorinated hydrocarbon; polymers of, for example, styrenes, butadienes, acrylonitriles, formaldehydes, vinyl alcohols or epoxies; or latex of such or other materials.

This screen 22 acts to keep the shape of the agglomerate and may be formed of or may include a catalyst to help cycle oxygen which is produced in any overcharge of the cell to allow oxygen to recombine with the active material of the anode. This principle is well known to the Ni-Cd battery technology but up to now has not been successfully used with $MnO_2$-Zn batteries. It is an observed fact that the oxygen as a gas does not readily recombine with metallic Zn in alkaline solution. However, this reaction rapidly progresses if an element of the positive position on the element chart like Cu is present. It is theorized that the Cu is first oxidized to CuO and that CuO immediately reacts with the adjacent Zn. This possible mechanism would classify the Cu as an oxidation catalyst for the recombination of oxygen gas and Zn. This process proceeds only slowly if the current collector like the Cu screen would be at the center of the Zn powder electrode or deeply immersed in the gelled electrolyte so that oxygen does not have an easy access to the interface. To support this theory of the formation of micro Zn dendrites which are immediately destroyed by the ensuing short circuit, there is the observation that such a cell with a positive $MnO_2$ electrode enclosed in a perforated metal structure separated by a porous separator or a fibrous separator can be satisfactorily charged against a Zn electrode. When the catalyst is not formed by the screen itself it may be coated or sintered thereonto.

The cathode 12 is separated from anode 14 which comprises zinc powder, by an electrolyte permeable diaphragm or separator 16 which is suitably formed of cellulose, possibly of fibrous cellulose. This diaphragm acts to prevent shorting of the cell due to any temporary dendrite formation. This feature makes it possible to operate the oxygen/zinc recombination cycle at higher speeds that would otherwise be possible.

The electrolyte, which may be mainly aqueous potassium hydroxide or sodium hydroxide, permeates the zinc powder of anode 14 and cathode 12 through separator 16. The electrolyte is suitable immobilised by gelling and suitable gelling and/or swelling agents which may be used are a gelling agent such as CMC, NaCMC, KCMC or other derivatives of CMC or a swelling agent of the group of methacrylics. The electrolyte may contain zinc oxide as an overcharge reserve.

The anode 14 is powder zinc material immersed in a gelled KOH electrolyte, and is surrounded by a metal screen current collector 18. This screen basket 18 has the purpose of drawing current from the powder zinc electrode during discharge and the powder zinc is converted to ZnO in a non conventional manner. Usually the current collector is in the center of the cell and the zinc particles are immersed in the gelled electrolyte to the outside. It is of advantage to position the current collector on or close to the outside.

An additive may be provided at the anode to accelerate precipitation of zinc oxide. This may be zinc oxide saturated calcium hydroxide or magnesium oxide. The basket 18 is provided with an end cap 20, for example of brass, insulated from the base of can 10 by insulating disk 15.

A current collector nail 24 projects into the anode 14 through a casing cover 25, with its head 26 being outside of the cover 25 to form the anode contact. The cover 25 seals the can 10 by crimping formed around its edge.

Is it possible that, on discharge the powder Zn is used up in the center first and progressively to the metal screen. On charge the outside current collector has the effect of depleting the zincate saturated electrolyte first at the interface between anode and cathode and depositing the Zn powder towards the center of the annular space.

As the experiment showed such an arrangement assures a very uniform plating of the Zn on charge and does not produce dendrites which may cause a short circuit through the separator between anode and cathode. There is the theoretical question if there is a situation existing whereby any dendrite which is formed is immediately consumed by the forthcoming short so in practice there is no dendrite produced which causes a permanent short as soon as the charge current is switched on. The statement that there are no dendrites produced should be understood in such a way that no permanent Zn bridges are formed between anodes and cathodes as is the case in regular $MnO_2$-Zn batteries near the end of charge.

Figure 2:
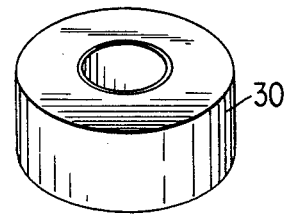
FIG. 2 shows one cathode element, a plurality of which may be assembled as the cathode in a cell according to the invention.
Figure 3:
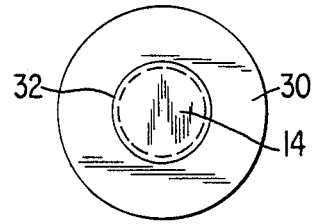
FIG. 3 is a horizontal section through a cell according to the invention and containing cathode elements of FIG. 2.
Figure 4:
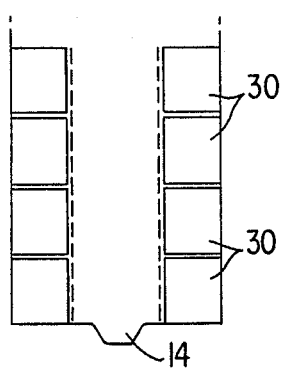
FIG. 4 is a vertical section through the cell of FIG. 3.

FIGS. 2, 3 and 4 show that a cathode for a cell according to the invention may be made as an assembly of annulae formed by pressing the cathode agglomerate into metallic annulus structures so that the metallic structure extends through the body of the cathode to the steel can 10 producing an electronic conductive connection with the catalytic surface 32, which, in this case is coated or sintered onto the inner surface of each annulus.

Figure 5:
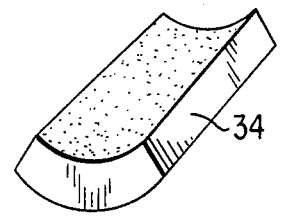
FIG. 5 shows another cathode element, a plurality of which may be assembled as the cathode a cell according to the invention.
Figure 6:
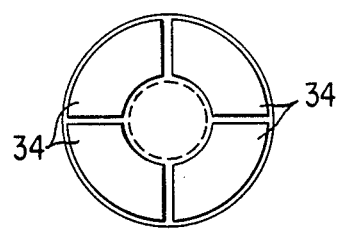
FIG. 6 is a horizontal section through a cell according to the invention and containing cathode elements of FIG. 5.

FIGS. 5 and 6 show that a cathode for a cell according to the invention can be made up from an assembly of segments 34. These segments 34 are formed in a similar manner to the annulae 30 in that the cathode agglomerate is pressed into metallic structures. Again catalyst layer is provided on the inner surface. Conveniently the segments are quadrants of a cylinder and four of them may be assembled as shown to form a cathode.

What is claimed is:

1. A rechargeable, alkaline, electrochemical cell comprising:
   a rechargeable manganese dioxide cathode mixed with graphite or other conductive carbon, agglomerated with a binder and contained by a metallic screen serving as an oxygen evolution catalyst carrier, and serving also to provide restrictive force against cathode expansion;
   a powdered zinc anode contained in a metallic basket;
   a separator between the cathode and the anode; and
   an alkaline electrolyte contacting the cathode and the anode through the screen, the basket and the separator;
   where said metallic basket is located at the inside of said separator, and said metallic screen is located at the outside of said separator and at the inside of said cathode.

2. A rechargeable, alkaline electrochemical cell as claimed in claim 1, in which the screen comprises a foraminous stainless steel case.

3. A rechargeable, alkaline, electrochemical cell as claimed in claim 1, in which the cathode is molded as annulae.

4. A rechargeable, alkaline, electrochemical cell as claimed in claim 1, in which the cathode is molded as longitudinal sections of a cylinder.

5. A rechargeable, alkaline, electrochemical cell as claimed in claim 1, in which the screen includes an oxyegen overvoltage reducing catalyst.

6. A rechargeable, alkaline, electrochemical cell as claimed in claim 1 in which the separator is permeable to the passage of oxygen.

7. A rechargeable, alkaline, electrochemical cell, as claimed in claim 6, in which the separator comprises cellulose.

8. A rechargeable, alkaline, electrochemical cell as claimed in claim 7, in which the separator is provided with fibrous reinforcement.

9. A rechargeable, alkaline, electrochemical cell as claimed in claim 8, in which the electrolyte is gelled.

10. A rechargeable, alkaline, electrochemical cell as claimed in claim 8, in which the electrolyte contains an overcharge reserve amount of zinc oxide.

11. A rechargeable, alkaline, electrochemical cell as claimed in claim 1, in which the electrolyte comprises an alkali metal hydroxide.

* * * * *